(12) United States Patent
Mainz et al.

(10) Patent No.: US 10,974,559 B2
(45) Date of Patent: Apr. 13, 2021

(54) WHEEL SUSPENSION LINK (71) Applicant: Ford Global Technologies, LLC, Dearborn, MI (US)

(72) Inventors: Daniel Mainz, Herzogenrath (DE); Rainer Souschek, Aachen (DE); Pascal Brandt, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 16/276,096

(22) Filed: Feb. 14, 2019

(65) Prior Publication Data
US 2019/0248200 A1 Aug. 15, 2019

(30) Foreign Application Priority Data

Feb. 15, 2018 (DE) .................. 10 2018 202 307

(51) Int. Cl.
*B60G 7/00* (2006.01)
*B29C 70/08* (2006.01)

(52) U.S. Cl.
CPC ............ *B60G 7/001* (2013.01); *B29C 70/081* (2013.01); *B60G 2206/013* (2013.01);
(Continued)

(58) Field of Classification Search
CPC .... B60G 7/001; B60G 7/00; B60G 2206/124; B60G 2206/014; B60G 2206/7101; B60G 2206/013; B60G 2206/12; B60G 2206/14; B60G 2206/141; B60G 2206/10; B29C 70/081; B29C 70/86; B29C 70/083; B29C 70/08; B29C 70/06; B29C 70/30; B29C 66/72; B29C 66/721; B29C 66/7214; B29C 66/72141; B29C 66/72143; Y10T 428/24994; Y10T 428/249941; Y10T 428/249942
(Continued)

(56) References Cited

U.S. PATENT DOCUMENTS 7,083,199 B2 8/2006 Graber et al.
9,168,801 B2 10/2015 Dicke et al.
(Continued)

FOREIGN PATENT DOCUMENTS

DE 102009014194 9/2010
DE 102011010367 8/2012
(Continued)

*Primary Examiner* — Keith J Frisby
(74) *Attorney, Agent, or Firm* — Raymond L. Coppiellie; Burgess Law Office, PLLC (57) ABSTRACT

A wheel suspension link including a structure connection location for connecting the link to a vehicle structure and a wheel carrier connection location connecting the link to a wheel carrier. The structure connection location and wheel carrier connection location arranged on a link member extending along a link plane. The link member including a base member formed in a materially integral manner from a discontinuously reinforced plastic material. The link member including a reinforcement, containing continuous fibers, connected to the reinforced plastic material. In one embodiment, the reinforcement limited with respect to the link plane to a first region of the link member while the base member extends into a second region.

18 Claims, 4 Drawing Sheets

(52) U.S. Cl.
CPC .... *B60G 2206/014* (2013.01); *B60G 2206/12* (2013.01); *B60G 2206/124* (2013.01); *B60G 2206/7101* (2013.01)

(58) Field of Classification Search
USPC .................................. 280/124.13; 428/297.4
See application file for complete search history.

(56) References Cited

U.S. PATENT DOCUMENTS

2007/0264470 A1* 11/2007 Wellman ............... B32B 27/306
428/105
2018/0290512 A1* 10/2018 Hirano ................... B60G 7/001

FOREIGN PATENT DOCUMENTS

| WO | 2012107272 | 6/2012 |
| WO | 2016015933 | 2/2016 |

* cited by examiner

WHEEL SUSPENSION LINK

CROSS-REFERENCE TO RELATED APPLICATIONS

Not Applicable.

BACKGROUND OF THE INVENTION

1. Field of the Invention

The present invention relates generally to a link for a wheel suspension; and more specifically to a link extending between a vehicle structure and a wheel carrier.

2. Description of Related Art

In modern motor vehicles, a wheel suspension connects the wheels to the vehicle structure, for example, the bodywork or chassis of the vehicle. The suspension both guides and spring mounts the wheel carrier or the wheel. Horizontally extending links, for example, transverse links or longitudinal links, connect the wheel carrier to the vehicle structure, typically the chassis, and guide the wheel carrier. One or more transverse links connect the wheel carrier to structure-side components, for example, a longitudinal carrier, an auxiliary frame or the like. The transverse links, with other suspension components, absorb horizontal forces, forces occurring in the X-Y plane. The transverse link typically has two structure-side connection locations and one or two wheel-side connection locations, although it is also possible to provide only one location connection. The structure-side connection locations, for example, metal/rubber composite bearings, produce an articulated connection and define a pivot axis resulting from their arrangement to each other. The pivot axis corresponds, in the installed state, normal to the X axis, the longitudinal axis of the vehicle, or is arranged at an angle with respect to it in the X-Y plane. When the wheel deflects, the pivot movement of the transverse link is carried out about this axis relative to the chassis. The wheel-side connection location or the wheel-side connection locations provide pivotability of the wheel carrier with respect to the transverse link.

Besides forged links, transverse links generally comprise light metal or steel. Links may also encompass one or two shells, including formed from sheet metal components. To provide these links with the necessary strength, the sheet metal undergoes a suitable forming operation, for example, drawing, with a profile providing it with a shell-like structure. Links that partially comprise fiber-reinforced plastic material are also known.

The isotropic property of the material provides metal links with an advantage, depending on the material they can be loaded identically in all directions. This property is often desirable since links are loaded in different directions. However, metal components are comparatively heavy, and steel components are at risk of corrosion, making additional corrosion protection necessary or limiting the service life of the component. With aluminum components, corrosion can usually be disregarded, but these components are generally cast or forged which, with mass production, leads to high tool costs. Components of fiber-reinforced plastic material are light, highly durable, damping and have a long service life. However, they are generally costly, have a long production time, and the material behavior is because of the fiber orientations further anisotropic, direction-dependent.

SUMMARY OF THE INVENTION

A wheel suspension link having a structure connection location and a wheel carrier connection location arranged on a link member along a link plane. The link including a base member formed from a discontinuously reinforced plastic material. The link also includes a reinforcement containing continuous fibers. The reinforcement connects to the base member in a materially integral manner with the reinforcement limited to a first region of the link member. The base member including a second region separate from the first region.

Further areas of applicability of the present invention will become apparent from the detailed description provided. It should be understood the detailed description and specific examples, while indicating an exemplary or preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the different Figures, identical components are always given the same reference numerals, for which reason they are generally also only described once.

Figure 1:
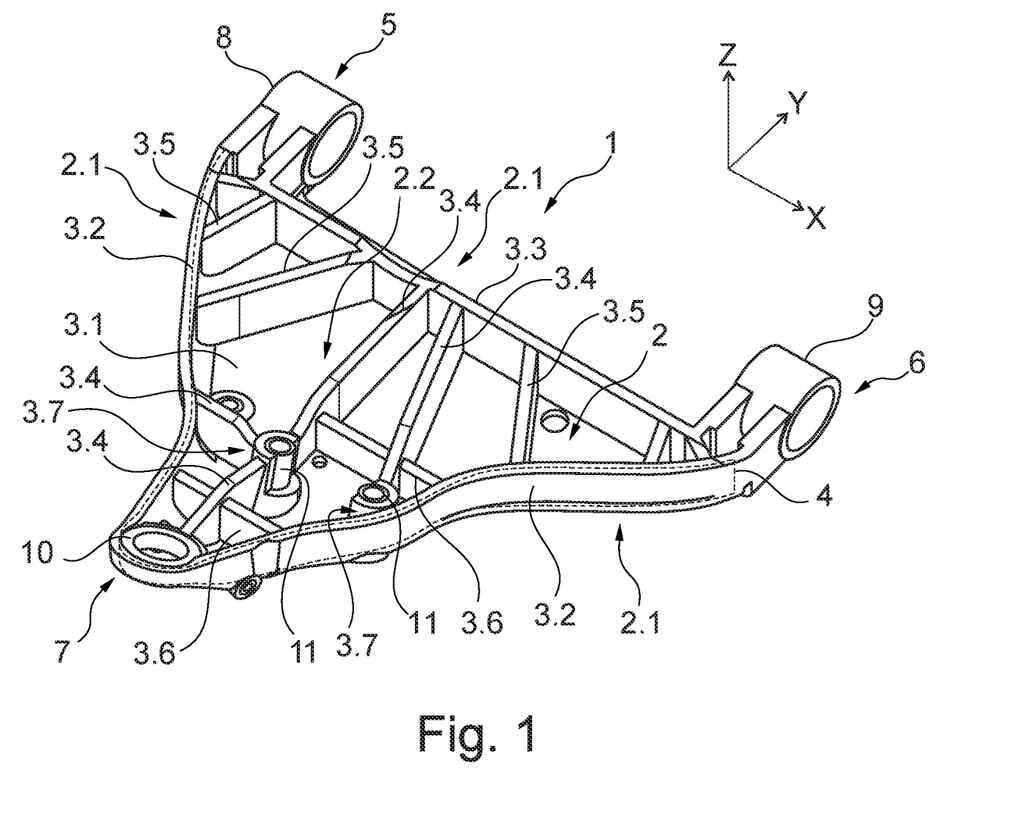
FIG. 1 is a perspective, top view of a transverse link according to a first embodiment of the invention.

FIG. 1 is a perspective illustration of a transverse link 1 for a wheel suspension of a motor vehicle, for example, a passenger vehicle. The X, Y and Z axes are illustrated in the installation position of the transverse link 1. The transverse link 1 includes a link member 2 extending along a link plane identical to the X-Y plane. Three connection locations 5, 6, 7 are arranged relative to each other on the link member 2 in the link plane. The connection locations are shown as two structure connection locations 5, 6 and a wheel carrier connection location 7.

Figure 3:
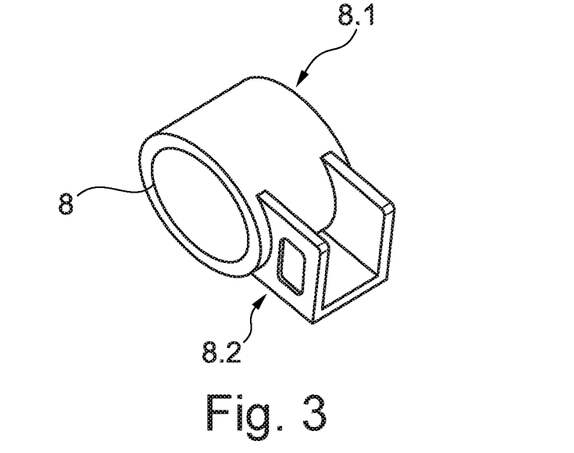
FIG. 3 is a perspective view of a bearing element of the transverse link of FIGS. 1 and 2.

The link member 2 includes a base member 3, produced with an injection-molding method from plastic material reinforced in a discontinuous manner with short and long fibers; for example, from polyamide reinforced with glass fibers. The base member 3 has a generally triangular, planar form. A first and a second structure metal bearing element 8, 9 and a wheel carrier bearing metal element 10 are cast partially in the plastic material matrix of the base member 3. FIG. 3 illustrates the first structure bearing element 8 having an eyelet-like bearing portion 8.1 that receives, for example, a rubber/metal bearing and a continuation 8.2 extending from the bearing portion 8.1. The continuation 8.2 connects the first structure bearing element 8 to the base member 3 in a positive-locking manner, for example a materially integral connection or a form fit connection. The second structure bearing element 9 may be constructed identically or in a mirror-symmetrical manner to the first structure bearing element 8. The wheel carrier bearing element 10 receives a ball joint and therefore has a different construction. However, a bearing portion and at least one continuation extending therefrom may also be provided.

FIG. 1 illustrates a perspective, top view of the transverse link 1 and shows an edge region 2.1 and inner region 2.2 of the link member 2. The edge region 2.1 in the link plane, X-Y plane, only takes up a relatively small surface. The edge region 2.1 extending about the perimeter of the base member 3. The base member 3 extends over both the edge region 2.1 and the inner region 2.2. A reinforcement 4, shown in FIG. 1 by broken lines, having continuous common fibers is cast only in the edge region 2.1 in the base member 3. The reinforcement 4 may be strip-like and incorporated in a first flange 3.2 constructed in the edge region 2.1 and extends approximately from the first structure connection location 5 over the wheel carrier connection location 7 to the second structure connection location 6. This first flange 3.2 is adjacent to a surface portion 3.1 of the base member 3 extending in a planar manner substantially parallel with the link plane and constructed in a comparatively thin-walled manner. An extent of the surface portion 3.1 in the Z direction is smaller than an extent in the X direction or Y direction.

The first flange 3.2 and a second flange 3.3 extend from the first structure connection location 5 to the second structure connection location 6 and improve the flexural rigidity of the link member 2. As shown the first and second flanges 3.2, 3.3 circumscribe the periphery of the base member 3. Incorporating the reinforcement 4 in a positive-locking manner increases the tensile strength of the first flange 3.2 in the X and Y plane. When forming the base member 3, the reinforcement 4 can be positioned beforehand in the shaping tool, after which it is enclosed by the plastic material matrix of the base member 3.

A plurality of insert components 11, for example, metal connectors, are connected in a positive-locking manner, for example a materially integral manner or form fit manner to the base member 3. The insert components 11 allow coupling of suspension components, for example, a suspension strut and a damper strut, to the transverse link 1. Coupling being uniting or joining two components or things at a predetermined place. The insert components 11 have a roughly cylinder-like form and are at least partially cast in a sleeve portion 3.7 of the base member 3. The precise form of the insert components 11 may vary and, for example, resemble the embodiments illustrated in FIGS. 8 and 9.

A series of reinforcement ribs 3.4, 3.5, 3.6 that protrude perpendicularly to the link plane from the surface portion and extend primarily, but not exclusively, at an angle of less than 30° with respect to the Y-axis improve transverse link 1 stability. A group of first reinforcement ribs 3.4 extend from an insert component 11 or a sleeve portion 3.7 to the edge region 2.1 of the link member 2 and can open at that location in a flange 3.2, 3.3. A force acting at the side of a connected suspension component on the respective insert component 11 is better absorbed and distributed over the link member 2 because of these reinforcement ribs 3.4. A group of second reinforcement ribs 3.5 connects at both ends with a flange 3.2, 3.3 and stabilizes the flange portion 3.1 with respect to the flanges 3.2, 3.3 and the flanges with respect to each other. A group of third reinforcement ribs 3.6 connects, in a similar manner, the first reinforcement ribs 3.4 to the first flange 3.2.

Figure 2:
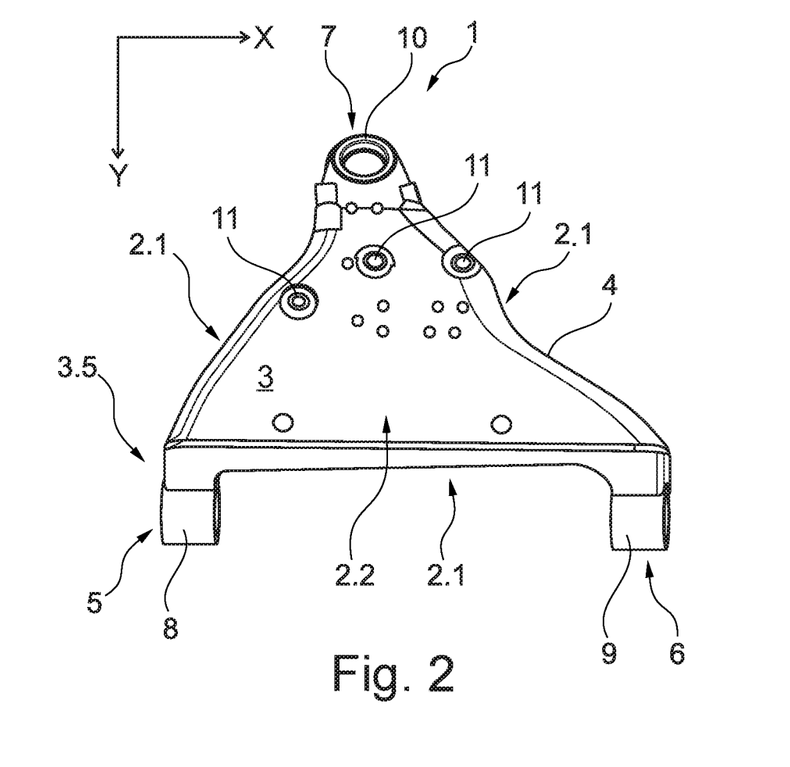
FIG. 2 is a perspective, bottom view of the transverse link of FIG. 1.
Figure 4:
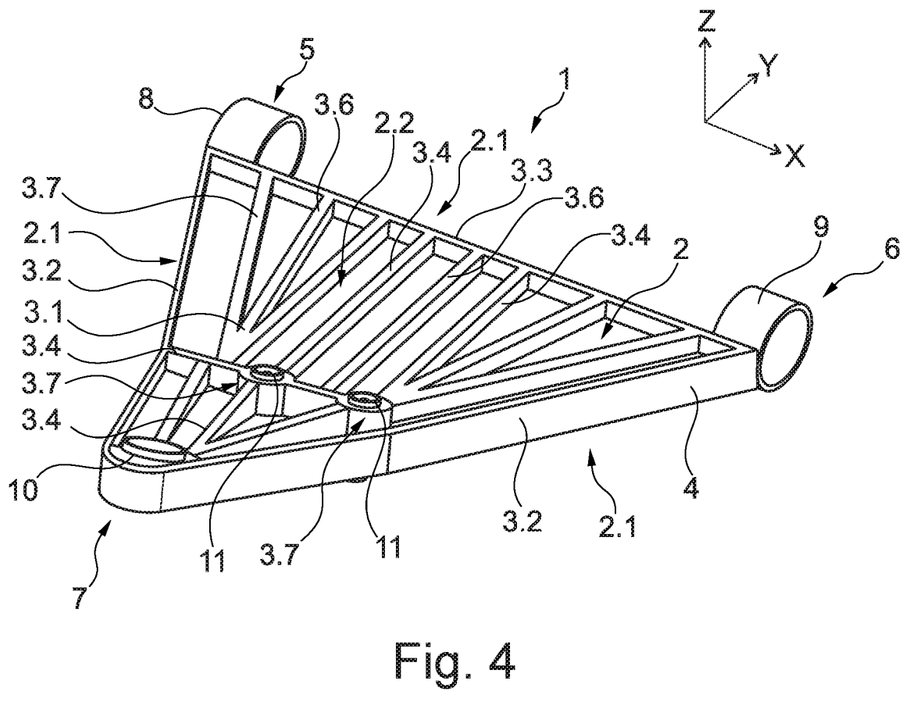
FIG. 4 is a perspective, top view of a transverse link according to a second embodiment of the invention.

FIG. 4 is a perspective illustration of a second embodiment of a transverse link 1 similar in terms of basic construction to the embodiment illustrated in FIG. 1-2. The reinforcement 4 is not completely cast in the plastic material matrix of the base member 3, but is instead at the outer side in the edge region 2.1, wherein the base member 3 can be cast to some degree on the reinforcement 4. It is also possible for the reinforcement 4 to be adhesively bonded or vulcanized thereon after casting the base member 3. The transverse link 1 in this instance includes a different number and configuration of reinforcement ribs 3.4, 3.6, wherein no reinforcement ribs that connect the two flanges 3.2, 3.3 directly to each other are provided. However, these could also be supplemented in the embodiment shown.

Figure 5:
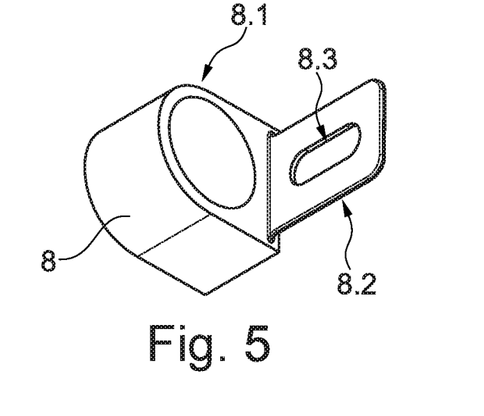
FIGS. 5-7 are perspective views additional embodiments of bearing components for a transverse link.
Figure 6:
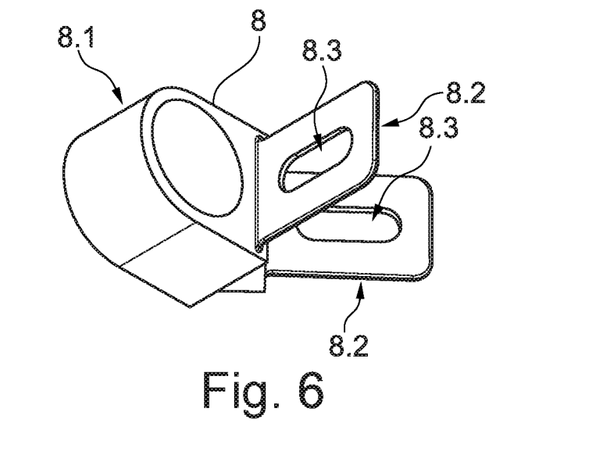

FIGS. 5 and 6 illustrate embodiments of a first structure bearing element 8 used in the transverse link 1 in FIG. 4. A bearing portion 8.1 used to receive a rubber/metal bearing, includes one or two continuations 8.2 each having a continuous recess 8.3. The respective continuations 8.2 are received in a positive locking manner in the plastic material matrix of the base member 3, including a materially integral manner or a form-fit manner. In one embodiment, the plastic material, reinforced in a discontinuous manner, also extends through the respective recess 8.3, producing a positive-locking connection. In one embodiment, the long fibers of the reinforcement 4 can be wound around the continuations 8.2 or guided through the recesses 8.3. The structure bearing elements 8 in FIGS. 5 and 6 may also be used in an identical or inverted form for the second structure connection location 6. The respective continuations 8.2 can also be received in a form fit manner in the plastic material matrix of the base member 3.

Figure 7:
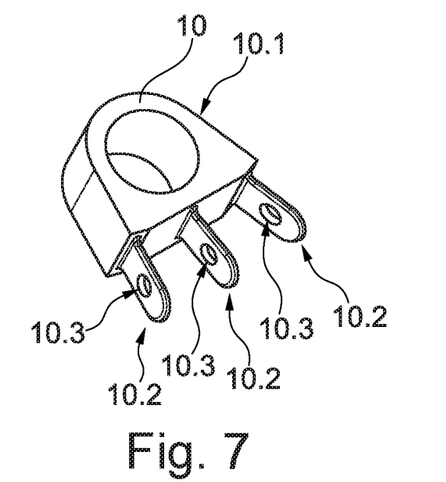

FIG. 7 shows a wheel carrier bearing element 10 including a bearing portion 10.1 for receiving a ball joint. Extending from the bearing portion 10.1 are three continuations 10.2 each having continuous recesses 10.3. The continuous recesses 10.3 provide a positive-locking connection to the plastic material of the base member 3. The wheel carrier bearing element 10 can also be used in identical or slightly modified form for the transverse link 1 illustrated in FIGS. 1 and 2. As with the first structure bearing element 8, the wheel bearing element 10 connects to the base member 3 in a positive locking manner.

Figure 8:
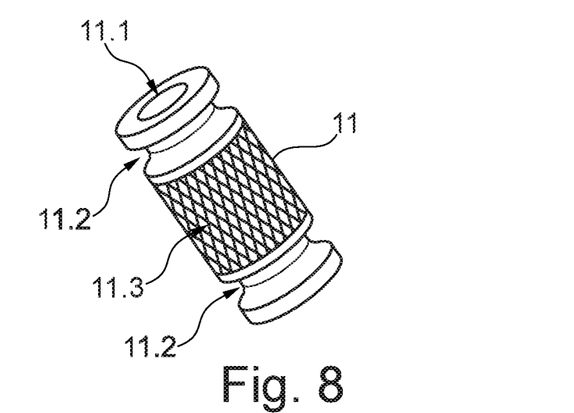
FIGS. 8-9 are perspective views of insert components for a transverse link.

FIG. 8 shows a first embodiment of an insert component 11 used with the transverse link 1 illustrated in FIG. 4 and where applicable, in a slightly modified state, for the transverse link 1 in FIGS. 1-2. The insert component 11 has a generally substantially cylindrical form with a through-opening 11.1. The opening 11.1 may be smooth or have an inner thread. The through-opening 11.1 extends an axial direction approximately in the Z direction or perpendicularly to the link plane. Tangentially extending grooves 11.2 prevent axial displacement of the insert component 11 with respect to the base member 3 provide a positive-locking connection and supplement the materially integral connection to the base member 3. The covering face of the insert component 11 has a profile 11.3 produces a positive-locking connection, for example a form-fit connection, in a tangential direction that prevents or at least makes twisting with respect to the base member 3 difficult.

Figure 9:
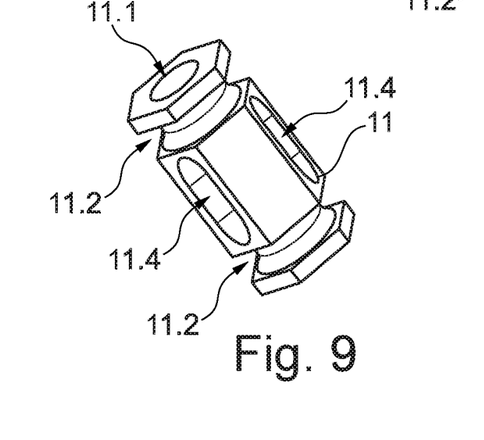

FIG. 9 shows a second embodiment of an insert component 11, having roughly a hexagonal/prismatic shape. The insert component 11 includes an axial through-opening 11.1 and tangentially extending grooves 11.2. The hexagonal form produces a positive-locking connection in a tangential direction that is further improved by axial grooves 11.4. These axial grooves 11.4 improve the positive-locking connection in an axial direction.

The wheel suspension is normally part of a road vehicle, for example, a wheel suspension of a passenger vehicle or truck, but may also, for example, be used with a trailer.

The link 1 has a structure connection location 5, 6 for a vehicle structure and a wheel carrier connection location 7 for a wheel carrier. The link is directly or indirectly connected to the vehicle structure at the structure connection location five, six. As used herein, the term "vehicle structure" is a collective term for a bodywork, a chassis, and where applicable an auxiliary frame of the vehicle, components that normally form the cushioned mass. At the wheel carrier connection location 7, the link is directly or indirectly connected to a wheel carrier, on which a wheel of the vehicle is rotatably supported.

The connection locations 5, 6, 7 are arranged on a link member 2 extending along a link plane. The link member 2 includes a base member 3 formed from discontinuously reinforced plastic material and a reinforcement 4 containing continuous fibers—the reinforcement 4 connected to the base member 3 in a materially integral manner. The link plane defined by the position of the connection locations 5, 6, 7 with respect to each other, the connection locations are arranged relative to each other in the link plane. The link member 2 extends along the link plane which, however, does not necessarily imply that it is constructed in a planar manner and extends in the link plane. Normally, the link plane—depending on the deflection state of the vehicle wheel—approximately corresponds to the X-Y plane of the vehicle. All references to the X-axis or longitudinal axis, Y-axis or transverse axis, and the Z-axis or vertical axis of the vehicle refer to the state of the link 1 when installed or connected to the vehicle.

Since the link 1 movably connects the wheel carrier to the vehicle structure, each respective connection location includes a pivotable connection. In one embodiment, one construction connection location or wheel carrier connection location defines a pivot axis extending parallel with the link plane. Configurations are also contemplated, for example, a connection location having a ball joint wherein no clear pivot axis is defined. The connection may be a resilient construction, for example, a rubber/metal composite bearing.

The link member 2 forms the main portion of the link 1 and determines the position of the connection locations relative to each other. The link member 2 maintains the mechanical stability of the link. The overall mass of the link 1 depends on the mass of the link member 2. To keep the mass low, the link member 2 has a base member 3 formed from a reinforced plastic material, the reinforcement in a discontinuous manner. In one embodiment, the reinforcement 4 includes fibers embedded in a matrix of plastic material or resin. The fibers are present as fiber pieces and thus have a limited length. They may be short fibers whose length is preferably up to 1 mm, and long fibers whose length is preferably between 1 mm and 50 mm. An exemplary embodiment includes a fiber-reinforced plastic material with fibers or fiber pieces whose length is preferably a maximum of 50 mm. Different materials can be used for the fibers and the plastic material matrix, for example, glass fibers and carbon and aramid fibers can be used in a polyamide matrix. The base member 3 is produced by an initial forming process, for example, casting, injection molding, or pressing. Generally, the plastic material is brought together with the fiber pieces, and positioned in a predetermined shape or configuration, wherein the plastic material solidifies, for example, with thermoplastic plastic materials, or hardens, for example, with thermosetting plastic materials, at the location making a particularly simple and cost-effective production possible.

To comply with mechanical requirements of the link 1 during operation of the vehicle, the mechanical stability of the base member may be insufficient. For this reason, the link member 2 may include a reinforcement 4 having continuous fibers. The continuous fibers may be a web or woven fabric. In one embodiment the reinforcement 4 may be constructed in a strip-like manner, for example, tape. The actual length of the respective continuous fibers may be different depending on the embodiment because they directly depend on the component dimensions, wherein the fibers normally extend without interruption from one end to the other end of the component or tape. Different materials can be used for the continuous fibers; carbon fibers can be used since they have a high level of rigidity with a low weight. However, other materials can also be used. Since the continuous fibers can be highly loaded in the longitudinal direction, the reinforcement 4, and consequently the link member 2, has in the corresponding direction excellent mechanical stability, in particular a high level of tensile strength and rigidity.

The reinforcement 4 is connected to the base member 3 in a materially integral manner. In one exemplary embodiment the reinforcement 4 is placed in a shaping tool, for example, a casting mold, before the base member 3 is cast or pressed. Forming the base member 3 casts the reinforcement 4 thereon or therein thereby connecting it in a materially integral manner. A single-stage procedure is preferred. Alternatively, the reinforcement 4 may be adhesively bonded or welded to the base member 3, in the latter case the surfaces of the plastic materials are made molten by heat wherein the plastic materials are connected to the reinforcement 4. The continuous fibers of the reinforcement 4 can be incorporated in a separate plastic material or resin matrix formed in a provided manner before materially an integrally connecting the reinforcement 4 to the base member 3. Alternatively, it is also possible for the continuous fibers to be placed in a shaping tool without an individual matrix and then bound by the plastic material matrix of the base member 3.

In one embodiment, the reinforcement 4 is limited with respect to the link plane to a first region of the link member 2, while the base member 3 extends into a second region. When the link member 2 projects onto the link plane, the reinforcement 4 is arranged only in a first region, or in a first part-region. In contrast, the base member 3 extends into a second region of the link member 2. The base member 3 is not entirely reinforced, but only selectively or partially in the first region. The first and second region need not be together per se. Instead, each region may form individual part-regions within the link plane. The first and second regions differ from each other. To provide mechanical stability, the link member is reinforced selectively in parts or locally in a targeted manner. Because of the high tensile strength of the continuous fibers, forces acting in the X direction and the Y direction are well absorbed.

The reinforcement 4 may be arranged at least partially peripherally around the second region. It may, for example, surround the second region, at least partially, in a strip-like manner. Although the base member 3 extends into the second region, it is also arranged in the first region where, as described above, it surrounds the reinforcement 4 in a materially integral manner.

Because the reinforcement 4 is in the first region, the materially integral connection to the base member can be more readily produced, or the reinforcement can be more readily integrated into the base member 3. Production or preparation of the reinforcement 4 can be less complex than situations wherein a reinforcement is constructed in a shell-like manner and cast with plastic material. The base member 3 forms at least primarily, where applicable completely, the outer surface of the link member 2. The surface of the link member 2 and the geometric shape thereof are defined by the shaping; for example, by the casting process of the base member. Consequently, production of the reinforcement 4 requires comparatively little precision. All these simplifications have a positive effect on production costs.

Preferably, the first region includes, with respect to the link plane, an edge region 2.1 of the link member and the second region includes, an inner region 2.2 of the link member 2 bounded by the edge region 2.1. The first region may be constructed as an edge region 2.1 and the second region as an inner region 2.2. When the link member is projected onto the link plane, the reinforcement 4, where applicable, is in an edge region 2.1, that is an outer region. The reinforcement 4 may extend over the entire edge region or only over a portion thereof. The base member 3 extends into an inner region of the link member 2 bounded or delimited toward the outer side by the edge region 2.1. The base member 3 is selectively reinforced in the edge region 2.1 or at the edge side. The reinforcement 4 may surround the inner region at least partially. In particular, the edge region may involve edges or borders or side faces of the link member at the outer side with respect to the X-Y plane.

The link 1 may be constructed as a longitudinal or oblique link, in one embodiment a transverse link. The link 1 may have at least three, or where applicable four, connection locations; for example, two structure connection locations and two wheel carrier connection locations. Another embodiment includes two structure connection locations 5, 6 and one wheel carrier connection location 7. The structure connection locations may, for example, have pivot bearings in alignment with each other while the wheel carrier connection location 7 may have a bearing for a ball joint. Configurations are conceivable in which the transverse link has in the X-Y plane a U-shape or V-shape, wherein a leg extends in each case from the wheel carrier connection location to a structure connection location. The link member 1 extending over a major portion of an inner space of the triangle or rectangle defined by the connection locations and constructed in a planar manner.

Sometimes, neither the discontinuously reinforced plastic material of the base member 3 nor the reinforcement 4, having continuous fibers, are stable enough to withstand local loads in the region of the connection locations. In one embodiment, at one connection location a separately produced bearing element 8, 9, 10 connects to the base member 3 in a positive-locking manner, for example, a materially integral connection or a form-fit connection. The bearing element 8, 9, 10 may, for example, be constructed from metal or another suitable sufficiently stable material. This bearing element 8, 9, 10 is separately prefabricated and may, for example, during the casting of the base member 3, be partially cast therein, producing a materially integral and positive-locking connection. Subsequent adhesive bonding to the base member 3 is also conceivable, as is a form-fit connection, that may include an adhesive. A positive-locking connection, whereby the bearing element 8, 9, 10 connects to the base member 3 in a stable manner may supplement the materially integral connection. In an exemplary embodiment, a positive-locking connection supplemented by a materially integral connection is preferred. If a bearing element 8, 9, 10 is, for example, constructed from steel, a coating can be used to protect the bearing element from corrosion. This corrosion protection may under some circumstances impair a purely materially integral connection. Under some circumstances, the materially integral connection may, however, be improved thereby. Also, a positive-locking connection may be produced with the continuous fibers of the reinforcement. For example, when the continuous fibers of the reinforcement are partially wound around the bearing element 8, 9, 10. Tensile forces acting from the side of the bearing element 8, 9, 10 are transmitted directly to the reinforcement 4, relieving the base member 3. The connection can be further improved by initially arranging the bearing element 8, 9, 10 to be twisted, for example, through 90°, with respect to the provided end position thereof, while the continuous fibers are wound around it, after which the bearing element is rotated to the end position helping to rearrange the continuous fibers, which can have a stabilizing effect.

To produce the materially integral positive-locking connection in an optimum manner, the bearing element 8, 9, 10 may preferably have a bearing portion and at least one continuation or continuation portion 8.2, 10.2 extending therefrom and incorporated in the base member in a materially integral manner. The bearing portion being the portion of the bearing element 8, 9, 10 that directly, or indirectly, produces a connection to the vehicle structure or the wheel carrier. The bearing portion normally arranged mostly outside the plastic material matrix of the base member. The continuation typically formed integrally with the bearing portion, for example, cast or forged together. The connection may include a plurality of continuations extending in different directions a bearing portion. One a connection is provided to the continuous fibers of the reinforcement, the extent direction of at least one continuation may correspond to the extent direction of the reinforcement. The continuation may have a recess or a through-opening improving the positive-locking connection to the plastic material matrix of the base member. The continuous fibers may also extend or be guided through the corresponding recess.

Often attached to the link, particularly when constructed as a transverse link, are other suspension components; for example, a resilient element and a shock absorber or oscillation damper—the suspension components connect to the link and the vehicle structure. A high local loading may occur at the connection, which could potentially damage or at least wear the base member 3. In one embodiment the inner region includes a separately produced insert component connected to the base member in a materially integral manner. The insert component constructed to connect a suspension component to the link. The precise configuration of the insert component dependent on the suspension component intended to be connected to the link. For example, the insert component may have a through-opening or a blind opening that engaging a complementary suspension component. Such an opening may also have an inner thread cooperating with an outer thread forming part of the suspension component. The insert component connected to the base member in a materially integral manner, wherein it is preferably also cast when the base member is cast. To better enable connection of the insert component, the base member 3 may form adjacent to a sleeve portion or collar portion 3.7 that surrounds the insert component 11.

The insert component 11 may be symmetrical. It may extend perpendicularly to the link plane from one side of the base member to the other side. A through-opening of the insert component may form a through-opening through the base member. Besides having a materially engaging connection to the base member, the insert component 11 may include a form-fit connection. In addition, the insert component may include may include of undercuts, flutes, grooves, ribs or the like forming the positive-locking connection thereto. The positive-locking connection provided transversely relative to the link plane, normally in the Z direction.

Furthermore, a positive-locking connection may be provided within the X-Y plane to prevent rotation of the insert component about the Z axis. The surface of the insert component may have a predetermined profile to enable a degree of positive-locking connection. For example, in an axial direction, the insert component may be constructed in a continuously rotationally symmetrical manner with a circular cross-section. Alternatively, the cross-section may be, for example, polygonal, for instance, rectangular or hexagonal. Because of such a cross-section, rotation with respect to the base member is also prevented.

In an exemplary embodiment, the reinforcement 4 extends continuously between each wheel carrier connection location and structure connection location to absorption forces acting along a connection line between a wheel carrier connection location and a structure connection location. With a transverse link, these forces act primarily in the Y direction. The reinforcement 4, in the embodiment of a transverse link with two structure connection locations and one wheel carrier connection location, extends from a first structure connection location to the wheel carrier connection location and from there further to the second structure connection location. The reinforcement 4 passes through all three connection locations. Force components acting in the X-Y plane are absorbed by the reinforcement 4. The reinforcement 4 may also extend between two structure connection locations or two wheel carrier connection locations.

The material-saving, weight-optimizing configuration of the base member is advantageous. In one embodiment the base member 3 has a surface portion 3.1 extending along the link plane and a plurality of reinforcement ribs 3.4, 3.5, 3.6. The surface portion 3.1 may have a small dimension transversely relative to the link plane that may be smaller than any dimension within the link plane; it can be described as planar or thin-walled. It may extend parallel with the link plane or, for example, have a degree of curvature, whereby it is further structurally stabilized. The reinforcement ribs 3.4, 3.5, 3.6 formed on the surface portion 3.1 stabilize the base member 3 and consequently the link. The reinforcement ribs are normally formed during initial casting of the base member 3 and together with the surface portion 3.1. The reinforcement ribs protrude perpendicularly to the link plane from the surface portion 3.1. The reinforcement ribs stabilize the link member and, increase the flexural rigidity thereof.

A flange extending 3.2, 3.3 perpendicularly to the link plane and having the reinforcement 4 may be formed in the edge region 2.1. The flange 3.2, 3.3 constructed to extend completely or partially around the inner region 2.2 and engage the surface portion 3.1. The flange 3.2, 3.3 is mechanically stabilized in whole or in part by the reinforcement 4. If the surface portion 3.1 is constructed to be curved the curvature may form a transition region to the flange 3.2, 3.3. The flange 3.2, 3.3 serving, in the same manner, as the reinforcement ribs 3.4, 3.5, 3.6, to improve the flexural rigidity of the link 1.

The reinforcement ribs 3.4, 3.5, 3.6 may extend along different paths, each path having a different configuration. In one embodiment, a reinforcement rib extends from an insert component to the edge region. The reinforcement rib absorbs, in an optimum manner, forces introduced in the insert component by connecting a suspension component into the link 1. Extending the reinforcement rib to the edge region distributes the force. If a sleeve portion is formed in the insert component, the reinforcement rib can start or extend therefrom. If a flange is arranged in the corresponding portion of the edge region, the reinforcement rib may extend as far as the flange.

According to another embodiment, both ends of a reinforcement rib extend to a flange. The flange is arranged at two opposing sides of the surface portion. The reinforcement rib extends from one side of the surface portion to the other and connects to the flange in a materially integral manner. Forces are introduced from the reinforcement rib into the respective flange and forces transmitted from the flange at one side to the flange at the other side. There is consequently produced an improved coupling, wherein the respective reinforcement rib constitutes a transverse connection between the flanges.

There are different orientations of the reinforcement rib, different possibilities can be adapted to the loading and may be used. Preferably, with a transverse link, at least one reinforcement rib extends at an angle of less than 45° relative to the Y axis, preferably less than 30°. Such a path improves the flexural rigidity of the transverse link about the X-axis and at the same time absorbs tensile forces along the Y-axis.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension link having a structure connection location and a wheel carrier connection location arranged on a link member along a link plane comprising:
    a base member formed from a discontinuously reinforced plastic material;
    a reinforcement containing continuous fibers, the reinforcement connected to the base member in a materially integral manner with the reinforcement limited to a first region of the link member and the base member including a second region separate from the first region; and
    wherein the second region includes an insert component connected to the base member in a materially integral manner, the insert component coupling a suspension component to the link.

2. A wheel suspension link having a structure connection location and a wheel carrier connection location arranged on a link member along a link plane comprising:
    a base member formed from a discontinuously reinforced plastic material;
    a reinforcement containing continuous fibers, the reinforcement connected to the base member in a materially integral manner with the reinforcement limited to a first region of the link member and the base member including a second region separate from the first region; and
    wherein the reinforcement extends from the wheel carrier connection location continuously to the structure connection location.

3. The wheel suspension link of claim 2 including a bearing element connected to the base member, at the structure connection location, in a positive locking manner.

4. The wheel suspension link of claim 3 wherein the positive locking manner includes a materially integral connection.

5. The wheel suspension link of claim 3 wherein the positive locking manner includes a form-fit connection.

6. The wheel suspension link of claim 3 wherein the bearing element has a bearing portion and a continuation portion extending from the bearing portion, the continuation portion connected to the base member in a materially integral manner.

7. A wheel suspension link having a structure connection location and a wheel carrier connection location arranged on a link member along a link plane comprising:
- a base member formed from a discontinuously reinforced plastic material;
- a reinforcement containing continuous fibers, the reinforcement connected to the base member in a materially integral manner with the reinforcement limited to a first region of the link member and the base member including a second region separate from the first region, wherein the first region includes an edge region of the link member, and the second region includes an inner region of the link member bounded by the edge region; and
- wherein the base member includes a surface portion extending along the link plane and a plurality of reinforcement ribs formed on the surface portion, the reinforcement ribs connected to the edge region in a materially integral manner.

8. The wheel suspension link of claim 7 wherein the edge region includes a surface portion having a flange extending perpendicularly to the link plane with the reinforcement in the flange.

9. The wheel suspension link of claim 8 including a reinforcement rib, a first end of the reinforcement rib connected to the flange and a second end of the reinforcement rib connected to the flange.

10. The wheel suspension link of claim 7 wherein the base member includes a reinforcement rib extending from an insert component to the edge region.

11. A wheel suspension link comprising:
- a base member formed from a discontinuously reinforced plastic material, the base member having first and second structure connection locations and a wheel carrier connection location;
- a first structure bearing element formed of metal connected to the base member in a positive locking manner at the first structure connection location, and a second structure bearing element formed of metal connected to the base member in a positive locking manner at the second structure connection location;
- a wheel carrier bearing element formed of metal connected to the base member in a positive locking manner at the wheel carrier connection location; and
- the base member having an edge region extending about a perimeter of the base member, the edge region including a reinforcement containing continuous fibers, the reinforcement connected to the base member in a materially integral manner.

12. The wheel suspension link of claim 11 wherein the base member includes an inner region separate from the edge region, the inner region including a plurality of reinforcement ribs.

13. The wheel suspension link of claim 12 wherein the base member includes a surface portion, the surface portion materially integral with the reinforcement ribs and the edge region.

14. The wheel suspension link of claim 11 wherein the base member includes an insert component connected to the base member in a materially integral manner, the insert component coupling a suspension component to the link.

15. The wheel suspension link of claim 11 including a bearing element having a bearing portion, a continuation portion, and a recess in the continuation portion, the reinforcement engaging the continuation portion.

16. The wheel suspension link of claim 11 wherein at least one of the positive locking manner at the first structure connection location, the positive locking manner at the second structure connection location, and the positive locking manner at the wheel carrier connection location includes a materially integral connection.

17. The wheel suspension link of claim 11 wherein at least one of the positive locking manner at the first structure connection location, the positive locking manner at the second structure connection location, and the positive locking manner at the wheel carrier connection location includes a form-fit connection.

18. A wheel suspension link comprising:
- a base member formed from a discontinuously reinforced plastic material, the base member including first and second structure connection locations and a wheel carrier connection location, the first and second structure connection locations and wheel carrier connection location forming a link plane;
- the base member having an edge region including a flange circumscribing a periphery of the base member;
- an inner region bounded by the flange;
- a reinforcement containing continuous fibers connected to the flange of the base member in a materially integral manner, the reinforcement extending between the first and second structure connection locations and including the wheel carrier connection location;
- the base member including a surface portion and a plurality of reinforcement ribs, at least one rib including a sleeve portion; and
- an insert component disposed in the sleeve portion and connected to the base member in a materially integral manner, the insert component coupling a suspension component to the link.

* * * * *